(12) United States Patent
Aalderink et al.

(10) Patent No.: US 8,622,405 B2
(45) Date of Patent: Jan. 7, 2014

(54) WHEEL AXLE SUSPENSION
(71) Applicant: Weweler Nederland B.V., Apeldoorn (NL)
(72) Inventors: Derk Geert Aalderink, Laren (NL); Geert Everts, Dalfsen (NL); Harm Damkot, Zutphen (NL); Hans Bramer, Eerbeek (NL)
(73) Assignee: Weweler Nederland B.V., Apeldoorn (NL)
( * ) Notice: Subject to any disclaimer, the term of this patent is extended or adjusted under 35 U.S.C. 154(b) by 0 days.
(21) Appl. No.: 13/682,873
(22) Filed: Nov. 21, 2012

(65) Prior Publication Data
US 2013/0147147 A1 Jun. 13, 2013

Related U.S. Application Data
(63) Continuation of application No. 12/669,878, filed as application No. PCT/NL2008/000177 on Jul. 18, 2008, now Pat. No. 8,317,209.

(30) Foreign Application Priority Data

Jul. 20, 2007 (NL) ..................................... 1034171
Nov. 23, 2007 (NL) ..................................... 1034756

(51) Int. Cl.
B60G 9/02 (2006.01)
B60G 3/12 (2006.01)
(52) U.S. Cl.
USPC ....... 280/124.116; 280/124.128; 280/124.153
(58) Field of Classification Search
USPC .................... 280/124.116, 124.128, 124.131, 280/124.132, 124.148, 124.149, 124.153, 280/124.157, 124.162, 124.164, 124.166, 280/124.167
See application file for complete search history.

(56) References Cited

U.S. PATENT DOCUMENTS 3,140,880 A 7/1964 Masser
3,434,707 A 3/1969 Raidel
(Continued)

FOREIGN PATENT DOCUMENTS

DE 29615286 U1 10/1996
DE 19841069 A1 3/2000
(Continued)

OTHER PUBLICATIONS

English Machine Translation of DE 19841069A1.
(Continued)

Primary Examiner — Paul N Dickson
Assistant Examiner — Laura Freedman
(74) Attorney, Agent, or Firm — Hoffmann & Baron, LLP

(57) ABSTRACT

A wheel axle suspension adapted to suspend an axle body of a wheel axle from a vehicle chassis comprises on both sides of the vehicle a bearing bracket arranged on the vehicle chassis. A rigid or flexible trailing arm extends in a longitudinal direction of the vehicle. The trailing arm has a resilient bush at a front end by means of which the trailing arm is hingedly connected to the bearing bracket. The trailing arm furthermore has a contact region essentially complementary to a portion of the outer contour of the axle body, where the axle body, in a fitted position, bears directly against the trailing arm. A support part opposes the contact region of the axle body. The support part is provided with a recess for accommodating the axle body, and is provided with a securing arm extending further towards the rear which is adapted to be secured to a pneumatic spring. Tensioning elements are provided tensioning the support part and the contact region of the trailing arm towards each other against the axle body. A pneumatic spring is provided which is operational between the securing arm and the vehicle chassis.

8 Claims, 5 Drawing Sheets

(56) References Cited

U.S. PATENT DOCUMENTS

| | | | |
|---|---|---|---|
| 3,531,099 A * | 9/1970 | King | 267/186 |
| 3,707,298 A | 12/1972 | Henry et al. | |
| 3,844,579 A | 10/1974 | Cunha | |
| 4,132,433 A * | 1/1979 | Willetts | 280/124.162 |
| 4,379,572 A * | 4/1983 | Hedenberg | 280/86.75 |
| 4,445,707 A * | 5/1984 | Raidel | 280/687 |
| 4,518,171 A * | 5/1985 | Hedenberg | 280/6.159 |
| 5,375,871 A | 12/1994 | Mitchell et al. | |
| 6,340,165 B1 | 1/2002 | Kelderman | |
| 6,508,482 B2 | 1/2003 | Pierce et al. | |
| 6,527,287 B2 * | 3/2003 | Hedenberg | 280/124.163 |
| 6,805,369 B2 | 10/2004 | Galazin | |
| 6,827,360 B2 | 12/2004 | Chan et al. | |
| 7,007,960 B2 | 3/2006 | Chalin et al. | |
| 7,048,288 B2 | 5/2006 | Chan et al. | |
| 7,077,413 B2 | 7/2006 | Svartz et al. | |
| 7,360,774 B2 | 4/2008 | Saieg et al. | |
| 7,607,670 B2 | 10/2009 | Raidel et al. | |
| 7,690,660 B2 | 4/2010 | Dudding et al. | |
| 7,900,942 B2 | 3/2011 | Koschinat | |
| 7,954,833 B1 | 6/2011 | Heath et al. | |
| 8,317,209 B2 * | 11/2012 | Aalderink et al. | 280/124.116 |
| 2005/0023788 A1 | 2/2005 | Svartz et al. | |
| 2005/0253351 A1 | 11/2005 | Pan et al. | |
| 2006/0033304 A1 | 2/2006 | Saieg et al. | |
| 2006/0163834 A1 | 7/2006 | Brereton et al. | |
| 2011/0254243 A1 | 10/2011 | Aalderink et al. | |
| 2011/0304115 A1 | 12/2011 | Aalderink et al. | |
| 2012/0228847 A1 * | 9/2012 | Aalderink | 280/124.116 |
| 2013/0001913 A1 * | 1/2013 | Aalderink | 280/124.153 |

FOREIGN PATENT DOCUMENTS

| | | |
|---|---|---|
| EP | 07214222 | 8/1995 |
| EP | 1138432 A2 | 10/2001 |
| EP | 1334848 A1 | 8/2003 |
| JP | 07214222 | 8/1995 |
| NL | 9001354 A | 1/1992 |
| NL | 1022395 C2 | 7/2004 |
| WO | WO 01/53779 A1 | 7/2001 |
| WO | WO 03/068540 A1 | 8/2003 |
| WO | WO 2007/133116 A | 11/2007 |

OTHER PUBLICATIONS

English Machine Translation of Abstract for JP 07214222.

* cited by examiner

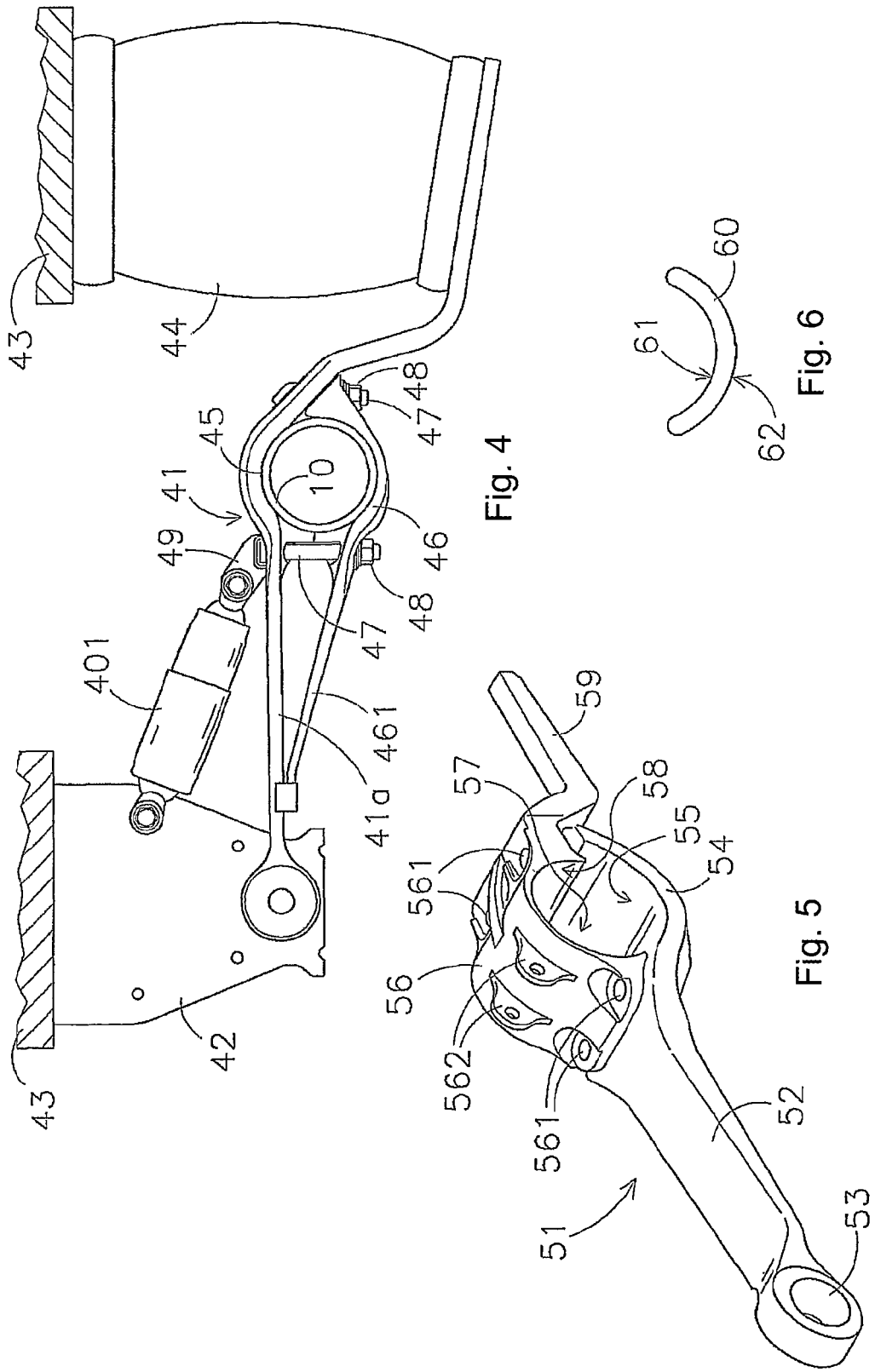

WHEEL AXLE SUSPENSION

CROSS-REFERENCE TO RELATED APPLICATIONS

This application is a continuation of U.S. application Ser. No. 12/669,878, filed Jun. 10, 2010, which is the National Stage of International Application No. PCT/NL2008/000177, filed Jul. 18, 2008, now U.S. Pat. No. 8,317,209, which claims the benefit of Netherlands Application Nos. 1034171, filed Jul. 20, 2007 and 1034756, filed Nov. 23, 2007, the contents of all of which are incorporated by reference herein.

FIELD OF THE INVENTION

The invention relates to the field of a wheel axle suspension for suspending an axle body of a wheel axle from a vehicle, in particular a road vehicle, such as a lorry or a lorry trailer.

In particular, the invention relates to the field in which a wheel axle suspension, on each side of the vehicle, has a suspension arm which extends substantially in the longitudinal direction of the vehicle, called a "trailing arm" in the art, and to which the axle body is attached, each trailing arm being hingedly connected at the front, viewed in the direction of travel of the vehicle, to a bearing bracket which is arranged on the vehicle chassis. In a known embodiment, a pneumatic spring is arranged between the trailing arm and the chassis of such a wheel axle suspension.

Trailing arms for wheel axle suspensions of this kind can essentially be divided into two types: spring trailing arms (also referred to as flexible trailing arms) and rigid trailing arms. In practice, a resilient bush is used for connecting rigid trailing arms to a bearing bracket which is mounted on the vehicle chassis, in which case the resilient bush absorbs relative movements of the wheel axle suspension. In the case of wheel axle suspensions which use spring trailing arms, the majority of the relative movements are absorbed by the deformation of a spring portion of the trailing arm itself. In this case, the spring trailing arm is often produced in the form of a monolithic and solid part from a suitable steel grade, in particular spring steel. The spring portion is situated between the area where the wheel axle is connected to the trailing arm and the front end of the trailing arm, where the arm is hingedly attached to a bearing bracket. The different operational principles of the trailing arms result in different requirements imposed on the trailing arms. Spring trailing arms are designed to be able to cope with relatively large deformations without breaking. This requirement also has consequences for the production of the trailing arms.

The invention relates inter alia to the trailing arm of a wheel axle suspension of this type, both with regard to the design of the trailing arm and with regard to the method for the production of a trailing arm of this type.

The invention also relates to the production of wheel axle suspensions of this type, in particular the production of such wheel axle suspensions for wheel axles having different diameters.

A first aspect of the invention relates to the contact of the axle body and the trailing arm in the case of a wheel axle suspension.

BACKGROUND OF THE INVENTION

A wheel axle suspension is disclosed in, for example, DE 296 15 286. With this known wheel axle suspension, the axle body is clamped directly against a contact region of a spring trailing arm by means of a clamping plate which is situated on that side of the axle body which is turned away from the trailing arm, and by a pair of U-shaped clamping straps extending around the trailing arm and through holes in the clamping plate. At the location of the axle clamp, the axle body is deformed to form a non-round contour with flattened regions which contact the contact region of the trailing arm. Here, the spring trailing arm has a constant width, that is to say, the contact region and the spring portion have the same width.

In order to save material, weight and space in the structure, the bearing springs are generally designed to be as narrow as possible, with the trailing arm still having a width and height which are such that the rolling motions of the vehicle can still be absorbed to a sufficient degree. In the case of the spring trailing arm from DE 296 15 286, this results in the axle body which extends at right angles to the trailing arm being only clamped in over a limited length of the axle body. As a result thereof, the axle body is subjected to high loads locally, due to the high clamping forces which are required to fix the axle. Particularly with thin-walled tubular axle bodies, this is a problem as these axle bodies, due to the great forces, are deformed significantly which adversely affects their service life. It is known to increase the length of the axle body which is clamped in by using an axle pad which is arranged between the trailing arm and the axle body and is wider than the trailing arm. Such a structure is shown, for example, in FIG. 7 of DE 296 15 286, but has the drawback that more parts are required which results in a more complicated fitting.

It should be noted that US 2006/0163834 discloses a wheel axle suspension having a rigid trailing arm which is produced by casting or forging and is provided with a sleeve through which the axle body extends in the fitted state. The sleeve may be formed as a single part, with the axle body having to be pushed into the latter in the axial direction, but the sleeve may also be made up of two halves which are welded to one another by means of axial welding after the axle body has been placed therein. The sleeve is wider than that part of the trailing arm which is situated in front thereof. The sleeve is designed to be welded to the axle body. To this end, the sleeve has openings in which a plug weld or the like can be provided for connecting the sleeve to the axle body.

SUMMARY OF THE INVENTION

It is an object of the first aspect of the invention to provide an improved wheel axle suspension.

This object is achieved, according to the first aspect of the invention, by means of a wheel axle suspension for suspending an axle body of a wheel axle from a vehicle, comprising on both sides of the vehicle a trailing arm which extends in the longitudinal direction of the vehicle and to which the axle body is attached. The trailing arm is hingedly connected at the front, viewed in the direction of travel of the vehicle, to a bearing bracket which is arranged on the vehicle chassis. A pneumatic spring is operational between the trailing arm and the chassis. The axle body, in the fitted position, bears directly against a contact region of the trailing arm, which contact region is essentially complementary to the outer contour of the axle body. The trailing arm is clamped against the axle body by means of clamping means. The trailing arm is wider at the location of at least the front of the contact region than in the region which is situated immediately in front thereof.

In one embodiment as a spring trailing arm, the trailing arm at the location of at least the front end of the contact region is wider than the spring portion of the trailing arm, which is situated more to the front. In practice, the spring trailing arm is usually provided with an integrally formed securing eye and the spring portion is situated between that securing eye and the contact region, the trailing arm having a significantly greater stiffness at the location of the contact region than the spring portion.

The first aspect of the invention makes it possible to make the design the trailing arm lightweight, while still clamping a sufficient length of the axle body to spread the load on the axle body resulting from the clamping and thus preventing the axle body from being subjected to locally excessive loads and to deformation, while not requiring any additional components between the axle body and the trailing arm.

It has been found that the axle body is mainly loaded and deformed at the front of the clamping arrangement. This makes it possible to taper the portion of the trailing arm which forms the contact region towards the rear, i.e. to reduce the width thereof towards the rear. At the front of the clamping arrangement, the axle body is then clamped over a sufficient length of the axle body, while the axle body is clamped over a smaller length at the rear of the clamp. This results in a saving in material and weight.

For example, the portion of the trailing arm which forms the contact region for the axle body, in top view, has an approximately triangular shape, the greatest width of which is situated at the front of said portion and the tip of the triangle being situated at the rear of that portion. This embodiment can be used in particular when the support part is provided with a securing arm for the pneumatic spring, preferably integrally formed with the support part, wherein the axle body is clamped between the trailing arm and the support part, and wherein the securing arm extends further towards the rear. In that case, for example, clamping means are provided which clamp the trailing arm and the support part against the axle body. For example, two holes are then provided near the wide front of that portion of the trailing arm which forms the contact region, and a single hole is provided at the narrower rear of said portion, for example in order to accommodate three clamping bolts (or one U-shaped strap and one bolt).

Preferably, the axle body has a substantially circular cross section at the location of the axle clamping arrangement. Axle bodies having a circular cross section are more capable of absorbing moments of torsion than axles with a different cross section, for example a square cross section. In addition, it is preferable to use a hollow axle body.

In a preferred embodiment, the support part surrounds the preferably round and hollow axle body over at least 180° of its periphery. As a result, the clamping force is distributed evenly over the periphery of the axle body and the axle body is prevented from becoming excessively deformed and deviating from a circular shape to an excessive degree. As a result of this measure, relatively thin-walled axle bodies can be used which in itself results in a weight saving of the vehicle.

In one possible embodiment, the support part is omitted and the trailing arm, at the location of the axle clamping arrangement is provided with holes on both sides of the axle, for inserting the shanks of U-shaped clamping straps. As a result of this measure, it may be possible to achieve a weight saving.

Preferably, the trailing arm is designed as a spring or flexible trailing arm. The rolling motions about the longitudinal axis of the vehicle are absorbed by these spring trailing arms.

In another possible embodiment, the trailing arm is designed as a rigid arm. Such rigid arms are hingedly connected to the bearing bracket by means of a resilient bush.

Preferably, the trailing arm and the axle body are locked with respect to one another by means of a locking means. As a result of this locking action, a rotation of the axle body with respect to the trailing arm due to torsional forces is prevented. Preferably, the axle body or trailing arm is provided with a projection at the location of the axle clamping arrangement and the trailing arm or axle body, is provided with a complementary recess for accommodating the projection.

If a support part is used, the support part may be provided with recesses for accommodating at least a bend portion of U-shaped clamping straps.

It is an object of a second aspect of the invention to improve, in a pneumatically sprung wheel axle suspension, the attachment of the axle body to the trailing arm by means of the clamping means and/or to provide an alternative solution.

The second aspect of the invention provides a pneumatically sprung wheel axle suspension for suspending an axle body of a wheel axle from a vehicle, comprising on both sides of the vehicle a trailing arm, which extends in the longitudinal direction of the vehicle and to which the axle body is attached. The trailing arm is hingedly connected at the front, viewed in the direction of travel of the vehicle, to a bearing bracket which is arranged on the vehicle chassis, as well as a pneumatic spring which is operational between the trailing arm and the chassis. The axle body, in the fitted position, bears against a contact region of the trailing arm, which contact region is essentially complementary to the outer contour of the axle body. A support part is provided on that side of the axle body which is turned away from the contact region, which support part is provided with a recess for accommodating the axle body, which support part is clamped against the axle body by means of clamping means. In this case, the portion of the trailing arm which forms the contact region for the axle body has two holes at the front of the contact region and one hole at the rear of the contact region, with the clamping means extending through these holes. This solution is based on the insight that the load on the axle body and any deformation of the axle body primarily takes place at the front of the clamping arrangement. In this case, the axle body is preferably hollow and advantageously has a circular cross section.

The solution according to the second aspect of the invention makes it possible to design the wheel axle suspension with fewer and/or smaller clamping means compared to the prior art, which facilitates mounting and can result in a saving on material and weight.

Preferably, the trailing arm is a spring trailing arm. In this case, the portion between the part where the trailing arm is hingedly connected to the bearing bracket and the contact region is the spring portion.

Preferably, the trailing arm is wider at the front of the contact region than at the rear of the contact region. As a result thereof, it is possible to achieve a saving on material and thus weight as well.

In one possible embodiment, the contact region has a substantially triangular shape when viewed from the top, in particular a shape which is substantially similar to that of an equilateral triangle.

In one possible embodiment, the clamping means are three bolts, the bolt shanks of which extend through the holes, with the bolt shank at the rear of the contact region having a larger cross section than the bolt shanks at the front of the contact region. As a result thereof, the cross section of the clamping means can be adapted to the load, for example in such a manner that the stresses in the clamping means are equal on both sides of the contact region.

In order to save material and thus weight without significantly reducing the strength of the trailing arm, it is possible to provide a depression which extends from one of the two holes at the front of the portion which forms the contact region in the direction of the hole at the rear of said portion.

In an advantageous embodiment, that portion of the trailing arm which forms the axle clamping arrangement has a central rib on the side which is turned away from the axle body which extends from the front of the portion which forms the contact region, between the two holes at said front, in the direction towards the single hole at the rear, a depression being provided on either side of this central rib wherein, in each case, one of the holes at the front is situated, with a further rib preferably being present along each side edge of the respective portion which delimits the depression on that side.

Preferably, the trailing arm is at least partially produced by forging. Preferably, at least the portion which forms the contact region is produced by forging. As will be explained below, the entire trailing arm is preferably produced by forging, with a securing eye at the front of the trailing arm being brought into the intended position after forging by twisting the trailing arm, if desired.

A third aspect of the invention relates to a wheel axle suspension, wherein an absorber is also provided, in practice usually a shock absorber having a telescopic body provided with mounting eyes on the ends of the body.

It is an object of the third aspect of the invention to provide improvements and/or to present alternatives for the attachment of such an absorber to that side of the absorber turned towards the trailing arm.

In a first variant according to the third aspect of the invention, a separate absorber securing part is provided which is provided with one or more lips or a fork for hingedly attaching an eye of a shock absorber, which absorber securing part is clamped between the trailing arm and the support part in the fitted position.

Preferably, the absorber securing part has a rear concave surface which, in the fitted position, contacts the axle body.

Preferably, the absorber securing part has one or more through-holes through which in each case one leg of a clamping means extends.

In a second variant according to the third aspect of the invention, a separate absorber securing part with a bush is provided through which, in the fitted position, a shank of one of the clamping means, for example a clamping bolt or clamping strap, extends, by means of which clamping means the bush is clamped against the trailing arm or support part, the bush being provided with one or more lips or a fork for hingedly attaching an eye of a shock absorber.

In a third variant according to the third aspect of the invention, it is provided that the absorber attachment is integrally formed with one of the clamping means, for example one clamping means is designed as a bolt with a bolt shank and a bolt head, the bolt head being provided with one or more lips or a fork for hingedly attaching an eye of a shock absorber.

A fourth aspect of the invention relates to the attachment of a possible absorber to the chassis. In practice, a shock absorber is usually provided between the trailing arm and the chassis, with the absorber usually having a telescopic body having an eye at each end of the body for attaching the absorber to the trailing arm and the chassis.

According to the fourth aspect of the invention, is provided a wheel axle suspension for suspending an axle body of a wheel axle from a vehicle, comprising a trailing arm which extends in the longitudinal direction of the vehicle and to which the axle body is attached, which trailing arm, in the direction of travel of the vehicle, is hingedly connected at the front to a bearing bracket which is arranged on the vehicle chassis, wherein furthermore an absorber attachment is provided for attaching an absorber which absorbs the movement of the trailing arm, which absorber has a telescopic body having an eye at each end of the body. The wheel axle suspension comprises a separate absorber securing part which is provided with one or more lips or a fork for hingedly attaching an eye of a shock absorber, which absorber securing part, in the fitted position, is directly connected to the vehicle chassis. This has the advantage that the forces are passed on directly to the vehicle chassis by the shock absorber and do not pass via the bearing bracket. As a result thereof, the bearing bracket can be optimized further for hingedly supporting the trailing arm. Furthermore, the fitting of the bearing bracket can be simplified if the shock absorber is no longer connected to the bearing bracket.

In one preferred embodiment, the absorber securing part is provided with an integral bolt shank, preferably a single integral bolt shank, which is inserted through an opening in the chassis of the vehicle and secured by means of a nut. This measure simplifies the fitting. In this case, the absorber securing part can be used to replace the normal bolt/nut connection, as a result of which the number of bolt/nut connections remains the same.

A fifth aspect of the invention relates to the efficient production of pneumatically sprung wheel axle suspensions, in particular wheel axle suspensions for wheel axles with different cross-sectional dimensions.

In practice, hollow tubular wheel axles having a circular cross section and an outer diameter of 127 mm are often used for lorries. For trailers, hollow tubular wheel axles having a circular cross section and an outer diameter of 146 mm are often used. Other diameters are also known.

It is an object of the fifth aspect of the invention to make efficient production of pneumatically sprung wheel axle suspensions possible.

To this end, the fifth aspect of the invention provides an assembly for a wheel axle suspension for suspending an axle from a vehicle. The assembly comprises a trailing arm which, in use, extends in the longitudinal direction of the vehicle and to which the axle can be attached, wherein the trailing arm can be hingedly connected to a bearing bracket which is attached to the vehicle chassis, which trailing arm has a contact region against which an axle body having a first outer diameter can bear directly, wherein the contact region is substantially complementary to the outer contour of the axle body having the respective outer diameter. The assembly furthermore comprises a support part which, in use, can be attached on that side of the axle body which is turned away from the contact region of the trailing arm, which support part is provided with a recess for accommodating the axle, and which support part is furthermore provided with a securing arm which, in the fitted position, extends to the rear from the support part, which securing arm is designed so that the underside of a pneumatic spring can be fitted thereto, the top side of the pneumatic spring being attached to the vehicle chassis. Moreover, the assembly comprises clamping means for clamping the contact region of the trailing arm and the support part against the axle body. According to this aspect, the assembly also comprises a shell part which can be fitted between the contact region of the trailing arm and the axle body, which shell part has an outer contact surface which is designed to bear in a fitting manner against the contact region which has a diameter which is adapted to the first diameter and has an inner contact surface which is designed to bear against an axle body having a second diameter, the second diameter being smaller than the first diameter.

According to the fifth aspect of the invention, it is provided that the trailing arm is produced for an axle body having a large outer diameter, for example 146 mm, but that it can also be used for axle bodies having a smaller diameter, for example 127 mm.

Preferably, with this aspect of the invention, the support part is provided with a recess which is adapted to the outer diameter of the axle body. In this manner, a universal trailing arm for axle bodies of different diameters can be produced, while a specific support part and, if desired, a specific shell part are produced for each variant embodiment.

The fifth aspect of the invention also relates to a method for producing wheel axle suspensions for wheel axles having axle bodies of different diameters, wherein use is made of the abovementioned assembly, wherein, based on the diameter of the axle body, no shell part or a shell part adapted to the diameter is fitted between the axle body and the trailing arm. In one preferred embodiment, different support parts having a recess adapted to the different diameters of the axle bodies are furthermore provided, with a support part being selected and fitted in the wheel axle suspension based on the diameter of the respective axle body.

A sixth aspect of the invention relates to the production of a spring trailing arm for a pneumatically sprung wheel axle suspension.

As has already been mentioned, the trailing arms for such a wheel axle suspension can be divided into two types: sprung and rigid trailing arms. Rigid trailing arms are connected to a bearing bracket on a vehicle chassis by means of a resilient bush, with the resilient bush absorbing the relative movements of the wheel axle suspension. With wheel axle suspensions which use spring arms, the majority of the relative movements are absorbed by the deformation of a spring portion of the trailing arm itself. This spring portion is situated between the area where the axle is connected to the trailing arm and the front end of the arm, where the arm is hingedly suspended from a bearing bracket. The various operational principles result in different requirements being imposed on the trailing arms. Spring trailing arms are designed to be able to cope with relatively large deformations without breaking. This requirement also has consequences for the production of the trailing arms.

It is known to produce rigid structures which do not allow great deformations by means of casting or forging. An example thereof is the rigid trailing arm from US 2006/0163834. This trailing arm is of the rigid type and is therefore only suitable for wheel axle suspensions wherein the resilient bush absorbs the deformations. A drawback of these wheel axle suspensions is the fact that these are less suitable for absorbing rolling motions of the vehicle.

By tradition, spring trailing arms have a substantially rectangular cross section and, according to the prior art, are always produced by rolling. By deforming and kneading the material during the rolling process, the trailing arm becomes resilient, thus preventing the trailing arm from breaking in the event of relatively small deformations. However, rolling has the drawback that passing a (semi-finished) product between two rollers results in the cross section of the product being unambiguously determined in one direction and no variation in cross section is possible, in principle, viewed in the longitudinal direction of the trailing arm.

Some variation in the cross section is still possible if the (semi-finished) product is not passed between the two rollers in its entirety, but is pulled back in time. Another option would be to move the rollers towards one another or further apart while the product is being passed through. Apart from the fact that this requires a complicated control unit for the process, the shape of the trailing arm is largely limited due to the production process.

Some variation in cross section also occurs because the rolling process usually only determines the thickness with sufficient accuracy. The dimensions in the other two directions, i.e. the longitudinal direction and the width direction, cannot be controlled in principle. All this is dependent on the starting material. Different starting materials lead to different end products, so that there is insufficient control over the three-dimensional dimensions of the product.

It is an object of the sixth aspect of the invention to provide an improved and/or alternative manufacturing method for the spring trailing arm.

According to the sixth aspect of the invention, the spring trailing arm is at least partially produced by forging. This has the advantage that the shape of the trailing arm is not limited to such a large degree by the manufacturing process. This offers more freedom in terms of design and can lead to savings on material, weight and space.

If there is more freedom in terms of design this offers the possibility of optimizing the design of a spring trailing arm further. Optimization of the trailing arm is desirable if, for example, the trailing arm is not only subjected to flexural loads, but, for example, also to torsional loads as a result of, inter alia, the rolling motion of the vehicle. By now using forging during the manufacturing process, more shapes are possible for the trailing arm.

A greater degree of freedom of design offers the advantage that parts of the trailing arm can be optimized for the function they perform. As a result, the trailing arm can be made more lightweight and still be sufficiently strong locally to absorb the loads to which it is subjected. Ultimately, the freedom of design leads to savings in material, weight and/or space.

Preferably, the trailing arm is made of spring steel.

Preferably, the trailing arm is made in its entirety in a single operation from the starting material. In other words, the trailing arm is preferably formed by one blow of the forging device.

With the invention, it is possible to carry out the forging on a rolled and/or cast semi-finished product. In this case, the semi-finished product formed by rolling and/or casting serves as a base for the finished product formed by forging. This ensures that there is less loss of material during the forging and simplifies the forging process.

In one possible embodiment, the semi-finished product comprises a projecting part. This projecting part is suitable for holding the semi-finished product and orienting it during forging. After the forging process, this part is removed. However, it is also possible for the projecting part by which the trailing arm is held not to be removed during forging, but for it to be part of the finished trailing arm. All this depends on the design of the trailing arm. An advantage thereof is the fact that even less material is required to manufacture the trailing arm.

After forging, the trailing arm is preferably hardened by means of a hardening process. This hardening process is preferably performed on the surface of the trailing arm.

A seventh aspect of the invention relates to a method for producing a trailing arm for a wheel axle suspension, preferably a pneumatically sprung wheel axle suspension, wherein the trailing arm has a securing eye at the front end. As is known, the trailing arm is in practice connected to a bearing bracket by means of the securing eye and a pin (if desired designed as a bolt) inserted through the eye, which bearing bracket is in turn attached to the chassis of the vehicle.

It is an object of the seventh aspect of the invention to provide an improved and/or alternative manufacturing process for such a trailing arm.

The seventh aspect of the invention provides a method for producing a trailing arm for a wheel axle suspension for suspending an axle body for a vehicle, wherein a securing eye is formed on the trailing arm by means of which the trailing arm can be hingedly connected on a bearing bracket on a vehicle chassis. Following the formation of the securing eye, the trailing arm is twisted about the longitudinal axis of the trailing arm, so that the securing eye is rotated through an angle, said twisting preferably taking place in a portion of the trailing arm which adjoins the securing eye.

The seventh aspect of the invention can advantageously be used for producing spring trailing arms of suitable steel.

An advantage of this method is the fact that the orientation of the securing eye can be adapted to the desired position in the wheel axle suspension.

A wheel axle is sometimes produced in the form of a bend in order to make space, for example, for a cardan shaft. In most cases, a trailing arm is then attached to a horizontal part of the wheel axle corresponding to a horizontally oriented hinge pin of the securing eye. By twisting the trailing arm and orienting the securing eye in this manner, the trailing arm can be attached to any part of the wheel axle, it being possible for the hinge pin to remain oriented horizontally in the fitted position (as is usual), while allowing the trailing arm to be attached to an oblique part of the wheel axle. In this case, any rotation can be used, preferably 1° to 90°, but larger rotations, such as for example 120°, are also possible.

A second advantage offered by this method relates to the manufacturing process. The invention makes it possible for the securing eye to be oriented differently during a step of the manufacturing process than in the finished wheel axle suspension. By now carrying out the manufacturing process with the eye at a different orientation and subsequently twisting the trailing arm, preferably in a defined region, which preferably has a round cross section, in order to reach the final orientation of the securing eye, the manufacturing process can be optimized.

Preferably, the trailing arm is, at least partially, produced by forging.

In one embodiment, the trailing arm is formed from a semi-finished product, the width being greater than the thickness of the semi-finished product. The securing eye is then, possibly in one blow, formed using a forging hammer in a pre-forming position of the eye, with the axis of the hole in the eye at that point in time still being in the thickness direction, that is to say at right angles to the width of the trailing arm, in particular when the spring trailing arm has a spring portion which has a substantially rectangular cross section. The forging hammer preferably also moves in said thickness direction, i.e. in fact at right angles to the principal plane of the trailing arm. The securing eye is then moved to the desired position by twisting a part of the trailing arm. The desired position of the eye will usually be rotated through 90° with respect to the pre-forming position, with the axis of the hole in the eye, after twisting, running substantially parallel to the width of the trailing arm.

When forming the securing eye, the forging hammer is possibly designed as the complementary portion of the half of the securing eye to be formed. On the other side of the forging hammer, an anvil is provided which is complementary with the other half of the securing eye to be formed. By now placing the portion to be formed between the forging hammer and the anvil, the securing eye can be formed, preferably with one blow.

Forming the trailing arm with the securing eye by forging offers the advantage that the forming process is quick compared to, for example, a prior art process using rollers wherein the eye has to be formed later by means of bending. This is advantageous for the time of passage of the trailing arm to be produced. In addition, forging makes it possible to produce an eye having a closed annular body portion surrounding the hole of the eye. This results in a strong eye and, compared to bending a rolled portion of the trailing arm, as is used in the prior art with spring trailing arms, has the advantage that there is no interruption in the material at a seam and no welding operation is required in order to close this seam.

It is conceivable that several blows of the forging hammer are required in order to form the securing eye. This is the case, for example, when the shape of the securing eye is relatively complicated.

Preferably, the securing eye formed by forging does not require any shape-defining finishing, but with more complicated shapes and/or more stringent requirements with regard to tolerances, it is expected that one or more, preferably simple finishing operations may be required to produce the final shape of the securing eye.

In one advantageous embodiment, a portion having a substantially round cross section, in particular a circular cross section is formed, adjacent to the securing eye, in such a manner that during twisting of the arm, the deformation takes place completely or at least substantially within the portion having the substantially round cross section.

Preferably, the trailing arm, or at least the front end thereof with the securing eye and the portion having a round cross section which is provided, if desired, and adjoins the securing eye, is formed in its entirety by forging in a forging device. In this case, the eye is preferably formed from a portion of the trailing arm which was originally—prior to forging—circular, with the hole being formed in the eye by forging. If desired, a hole could already be present in the originally circular portion.

Preferably, twisting takes place after forging using a twisting device, when at least the portion of the trailing arm which is to be twisted is hot, in practice red-hot, preferably still hot from forging and/or as a result of suitable heating of the part to be twisted. Preferably, twisting takes place in a single uninterrupted twisting movement until the desired position of the securing eye has been reached.

An eighth aspect of the invention relates to a wheel axle suspension for suspending an axle body of a wheel axle from a vehicle. In this case, there is provided a trailing arm for a wheel axle suspension for suspending an axle body of a wheel axle from a vehicle, which trailing arm has a securing eye at a front end for attaching the trailing arm to the vehicle, for example to a bearing bracket which is provided on the vehicle chassis, for example using a hinge bolt. Adjacent to the securing eye, the trailing arm has a portion which has a substantially round cross section, in particular a circular cross section.

One advantage of this round cross section is the fact that stresses in the material resulting from torsion due to, for example, a rolling motion of the vehicle, are distributed virtually evenly along the periphery of the cross section, where the deformation and the stress is greatest.

Another advantage of this aspect of the invention becomes clear in combination with the twisting of the trailing arm in order to orient the securing eye. When the portion of the trailing arm which is adjacent to the securing eye has a substantially round cross section before the securing eye is twisted and the deformation during twisting takes place completely or substantially in the portion having the substantially round cross section, this not only results in uniform stresses along the periphery of the cross section, but the shape of the portion of the trailing arm which is adjacent to the securing eye is also substantially identical to the situation prior to twisting and there is less superfluous material.

In one embodiment, the trailing arm comprises at least one portion having a substantially rectangular cross section between the securing eye and the arm region where the axle body is connected to the trailing arm. This has the advantage that the stiffness of the trailing arm can be optimized in various directions. This is particularly advantageous if the trailing arm also has to absorb transverse forces, for example when the vehicle goes around a bend.

In order to prevent peak stresses or stress concentrations as much as possible, the portion having the substantially round cross section then preferably merges smoothly with the portion having the substantially rectangular cross section.

The eighth aspect of the invention can be used with both sprung and rigid trailing arms. If the trailing arm is a spring trailing arm and has a portion which has a substantially rectangular cross section, this portion is preferably the spring portion.

In one embodiment, the trailing arm, or at least the front part thereof, is produced by means of forging, preferably according to one or more aspects of the invention.

It will be clear to those skilled in the art that the forged trailing arms according to the various aspects and preferred embodiments of the invention, as is already customary for pneumatically sprung wheel axle suspensions for lorries, trailers and the like, are preferably designed as monolithic and solid parts made from a suitable steel grade, particularly spring steel in the case of spring trailing arms.

It will be clear to those skilled in the art that the various aspects of the invention can be used separately, but also in all kinds of different combinations. Non-limiting examples of the aspects and of combinations of these aspects of the invention will be explained below with reference to the drawing.

The invention also relates to a vehicle provided with a wheel axle suspension according to one or more aspects of the invention and/or a trailing arm according to one or more aspects of the invention, the wheel axle suspension preferably being pneumatically sprung. The vehicle is for example a lorry or a lorry trailer.

BRIEF DESCRIPTION OF THE DRAWINGS

FIG. 4 shows a side view of a wheel axle suspension according to the invention with an alternative embodiment of a trailing arm;

FIG. 5 shows a perspective view of another alternative embodiment of a trailing arm for a wheel axle suspension according to the invention;

FIG. 6 shows a side view of a shell part which can be used with the trailing arm from FIG. 5;

DETAILED DESCRIPTION OF PREFERRED EMBODIMENTS

Figure 1:
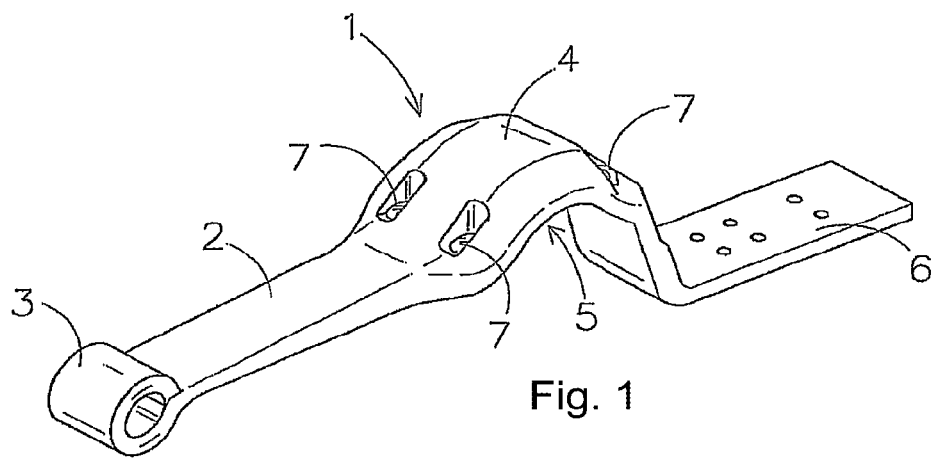
FIG. 1 shows a perspective view at an angle from above of a preferred embodiment of a trailing arm for a wheel axle suspension according to the invention.
Figure 2:
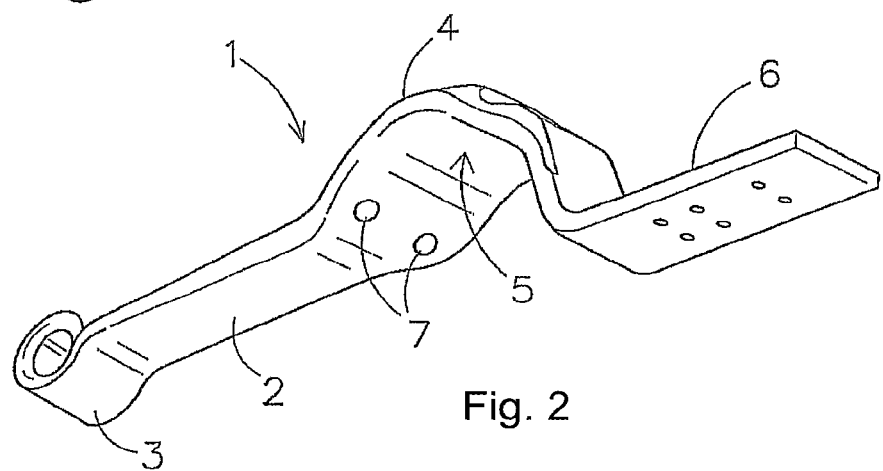
FIG. 2 shows a perspective view at an angle from below of the trailing arm from FIG. 1.

FIG. 1 and FIG. 2 show a spring trailing arm 1, which is also referred to in the art as a flexible trailing arm. The trailing arm 1 has a spring portion 2 which is provided at the front, viewed in the direction of travel of the vehicle, with a securing eye 3. The trailing arm 1 can, by means of a hinge bolt, be hingedly connected to a bearing bracket which is provided on the underside of a vehicle chassis. The bearing bracket or equivalent supporting structure can also be integral with the vehicle chassis.

Following on from the spring portion 2 of the trailing arm 1, a curved portion 4 is formed, which curved portion 4 has a concave contact surface 5 which is directed downward in the example shown. Following on from the curved portion 4, an end portion 6 is formed which is intended for fitting a pneumatic spring thereto. The illustrated trailing arm 1 has a shape which is referred to in the field as "gooseneck".

The spring portion 2 of this arm 1 has a substantially rectangular cross section having a width and a thickness, the width being greater than the thickness. The spring portion 2 may be produced by rolling, but could also be produced by forging. The curved portion 4 is preferably produced by forging.

In this case, four bore holes 7 are provided in the curved portion 4 which serve to insert clamping bolts. The bore holes 7 are recessed with respect to the top surface of the curved portion.

Figure 3:
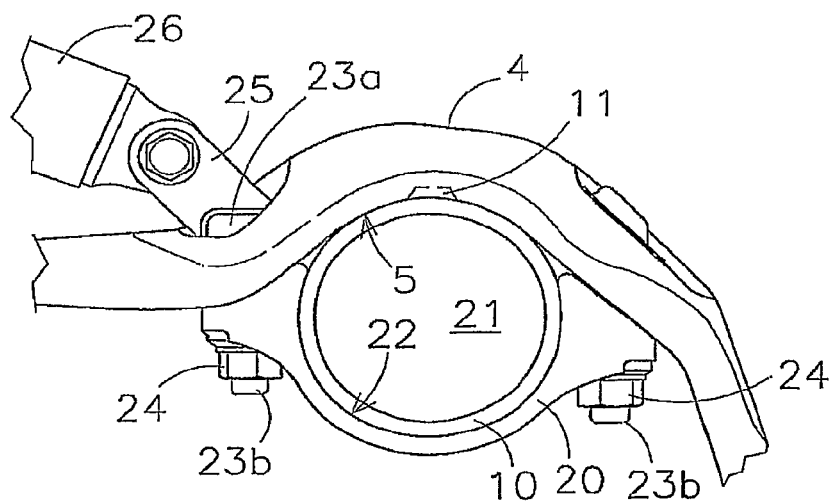
FIG. 3 shows a side view of an axle clamping arrangement wherein a round axle is clamped against the trailing arm from FIG. 1.

FIG. 3 shows how an axle body 10 which is designed as a relatively thin-walled, substantially round tube is clamped against the trailing arm 1. Such a tubular axle body has, for example, an outer diameter of 146 mm and a wall thickness which is between 7 and 9 mm. Such an axle body can be deformed in the radial direction relatively easily.

FIG. 3 shows that the axle clamping arrangement here comprises a support part 20, as is preferred in combination with a hollow axle body. The support part 20 has a recess 21 in which a part of the axle body 10 is accommodated. In the fitted position, a part of the periphery of the axle body 10 is clamped against the inner wall 22 of the recess 21, which inner wall 22 is complementary with the outer contour of the axle body 10. The support part 20 is clamped against the underside of the axle body 10 by means of bolts 23, having a bolt head 23a and a bolt shank 23b, which are inserted into bore holes 7 in the trailing arm 1, and by means of nuts 24.

As can clearly be seen in FIG. 3, more than 180° of the periphery of the axle body 10 bears against the inner wall 22 of the support part 20. The inner wall 22 of the support part 20 and the contact surface 5 of the curved portion 4 of the trailing arm 1 surround virtually the entire periphery of the axle body 10, as FIG. 3 clearly illustrates. This is advantageous when clamping relatively thin-walled axles since the load is omnidirectional, as a result of which the axle body 10 remains round at the location of the clamping arrangement.

In this example, the curved portion 4 of the trailing arm 1 is wider than the spring portion 2. The width of the spring portion 2 is such that the rolling motion of the vehicle can be withstood. The curved portion 4 is wider, resulting in a lower surface pressure on the axle body, in particular when absorbing transverse forces. The round hollow axles can be clamped directly against the trailing arm, without the use of an axle pad or another fitting piece. It is known from the prior art to arrange an axle pad between the axle and the trailing arm, which axle pad is arranged in a fitting manner against the axle body on that side which is turned towards the axle and is arranged in a fitting manner against the trailing arm on that side which is turned towards the trailing arm.

In the context of the first aspect of the invention, however, provision is made for a so-called galvanized plate to be fitted between the axle body and the trailing arm. This relatively thin galvanized plate offers cathodic protection against stress corrosion of the trailing arm, but does not serve any purpose in connection with arranging the axle body and the trailing arm together in a fitting manner.

FIG. 3 shows a possible embodiment of the front clamping bolts 23. The bolt heads 23a of the front clamping bolts 23 are provided with securing lips 25 to which a shock absorber 26 is hingedly attached. The securing lips 25 extend from the bolt head 23a upwards and to the front at an angle. It is also possible for a single bolt head to be provided with several lips or with a fork, for example in order to arrange the eye of a shock absorber therebetween.

The axle body 10 is preferably locked against rotation with respect to the trailing arm 1. In theory, there are several options for locking. Preferably, locking is effected by providing a recess or depression in the contact surface 5 and to provide a projection on the axle body 10, for example in the form of a welded-on spline 11, as is illustrated in NL1022395. In addition to locking against a movement of the axle with respect to the trailing arm resulting from the action of torsional forces, for example due to the wheels of the vehicle braking, the projection and the recess furthermore also form a positioning means for axially correctly positioning the axle in the correct manner during assembly. Another possibility of locking against rotation is to provide a projection, for example in the form of a segment of a sphere, on the contact surface 5. The axle may be provided with a recess or depression as is illustrated in EP 1 334 848 in the name of Schmitz Cargobull AG.

In addition to the possibility of locking the axle body 10 with respect to the trailing arm, an embodiment is also conceivable wherein the axle body 10 is locked in a similar way with respect to the support part 20. A variant involving locking of the axle body 10 with respect to both the trailing arm and the support part is also possible. The same applies to the embodiments which have been illustrated in FIGS. 4 and 5.

FIG. 4 shows a wheel axle suspension for suspending a round hollow axle 10 from a vehicle. The wheel axle suspension comprises on both sides of the vehicle a trailing arm 41 which extends in the longitudinal direction and to which the axle 10 is attached. The trailing arm 41 is hingedly connected at the front, viewed in the direction of travel of the vehicle, to a bearing bracket 42 which is arranged on the underside of the vehicle chassis 43. At the rear, a pneumatic spring 44 is fitted between the trailing arm 41 and the chassis 43.

In the assembled state, the axle body 10 bears directly against a contact region 45 of the trailing arm 41. The shape of the contact region 41 is essentially complementary to the outer contour of the axle body 10. On the side of the axle body 10 which is turned away from the contact region 45 of the trailing arm 41, a support part 46 is present which is provided with a recess for accommodating the axle 10. The trailing arm and the support part 46 are clamped against the axle body 10 by means of clamping bolts 47 and nuts 48.

In this example, the front clamping bolts 47 are provided on their bolt heads with a securing lip 49 to which an end of a shock absorber 401 is attached. The other end of the shock absorber 401 is connected to the bearing bracket 42 or directly to the chassis.

On the support part 46, an additional arm 461 is fitted which extends to the front and upwards at an angle from the support part 46 and is connected to the trailing arm 41 on the end which is turned away from the support part. The connection between the additional arm 461 and the trailing arm 41 serves to reduce the load on the trailing arm 41. The additional arm 461 can be designed as a spring.

FIG. 5 shows an alternative embodiment of a trailing arm. On the front end which is to be fitted to the bearing bracket, the trailing arm 51 has a securing eye 53, by means of which the trailing arm 51 can be attached to the bearing bracket by means of a hinge bolt. The trailing arm 51 has a spring portion 52. Adjacent to the spring portion 52 of the trailing arm 51, a curved portion 54 is formed, which curved portion 54 has a concave contact surface 55 which is facing upwards in the illustrated example. The curved portion 54 tapers towards the spring portion in the width direction.

FIG. 5 furthermore shows a support part 56 which is positioned opposite the curved portion and has an axle recess 57 for accommodating a part of the periphery of the axle body.

For the sake of clarity of the drawing, the axle body has been omitted in this FIG. 5. In the fitted position, a part of the periphery of the axle body bears against the inner wall 58 of the recess 57, which inner wall 58 is complementary to the outer contour of the axle body. The support part 56 is clamped against the top side of the axle body by means of bolts (not illustrated). To this end, the support part is provided with securing holes 561.

As can clearly be seen in FIG. 5, more than 180° of the periphery of the axle body lies against the inner wall 58 of the support part 56.

In this example, the inner wall 58 of the support part 56 and the contact surface 55 of the curved portion 54 of the trailing arm 51 surround virtually the entire periphery of the axle body 10, as FIG. 5 clearly shows. This is advantageous when clamping relatively thin-walled axles since the load is then omnidirectional, as a result of which the axle body 10 remains round at the location of the clamp. Incidentally, it is also conceivable for the curved portion of the trailing arm to surround the periphery of the axle body over more than 180°.

The support part 56 is provided with a securing arm 59, which in this case is integrally formed with the support part, which arm 59, in the fitted position, extends from the support part 56 to the rear. The securing arm 59 is designed so that the underside of a pneumatic spring (not shown) can be fitted thereto. The top side of the pneumatic spring is attached to the vehicle chassis. Thus, the pneumatic spring in this case acts on the hingedly connected trailing arm 51 via the support part 56.

In this example, the support part 56 is provided with two securing lips 562 at the top side which extend upwards and to the front at an angle. In the fitted position, a securing eye of a shock absorber is arranged between the securing lips 562, which securing eye is hingedly connected to the securing lips 562 by means of a bolt.

It is also possible to omit the securing lips 562 and instead use, for example, the bolts 23 shown in FIG. 3 and having a bolt head 23a which is provided with a securing lip 25.

In practice, axle bodies with different outer diameters are used. Thus, trailers often use an axle body with an outer diameter of 146 mm, while lorries for example use an axle tube of 127 mm. As has been described above, according to one aspect of the invention, the curved portion 54 with the concave contact surface 55 of the trailing arm 51 may be designed to bear directly against an axle body having a specific diameter, for example 146 mm or 127 mm.

According to one aspect of the invention, the trailing arm 51 is produced for a large outer diameter of a first axle body, for example 146 mm, and can then also be used for a second axle body having a smaller diameter, for example 127 mm. According to one aspect of the invention, this becomes possible by arranging a shell part 60 (see FIG. 6) between the curved portion and the second axle body, which shell part 60 has an inner contact surface 61 having an inner diameter which corresponds to the outer diameter of the second axle body, and has an outer contact surface 62 having an outer diameter which can be arranged in a fitting manner against the contact surface 55 of the curved portion 54 of the trailing arm 51, which corresponds to the first axle body.

The shell part 60 is preferably produced by casting. According to this aspect of the invention, it is also possible for the support part 56 to be provided with a recess 57 which is adapted to the outer diameter of the axle body.

In one possible embodiment, the contact surface 55 of the curved portion 54 of the trailing arm 51 is adapted to an axle tube having an outer diameter of 146 mm. In the curved portion 54, the outer contact surface 61 of a shell part 60 is arranged against the contact surface 55 of the curved portion 54 of the trailing arm 51, which shell part 60 has an inner contact surface 61 having an inner diameter of 127 mm. The associated support part 56 has a recess 57 with an inner diameter of 127 mm.

In addition to the recess 57, it is also possible for the shape and length of the arm 59 of the support part 56 to be adapted to the specific variant of the wheel axle suspension. In this manner, a universal trailing arm 51 can be produced which is suitable for various variant embodiments of wheel axle suspensions, whereas one specific support part 56 is produced for each variant embodiment. This makes it possible to produce the trailing arm 51 in large numbers which reduces the production costs per trailing arm as the production line only has to be designed to manufacture one single trailing arm 51. This is particularly advantageous if the trailing arm 51 is produced by means of relatively expensive processing steps, such as rolling and/or forging, which will, according to the invention, often be the case when producing flexible trailing arms.

The support part 56 is preferably produced in several variants, depending on the variant embodiments, in particular diameters, of the specific wheel axle suspensions.

Preferably, the support part 56 with the integrally formed arm 59 is produced by forging or casting, in which case it should be pointed out that casting is less expensive than forging in the case of relatively small production numbers.

With the embodiment from FIG. 5, a locking against rotation is preferably provided between the support part 56 and the axle body, in particular when a shell part 60 is used.

Figure 7:
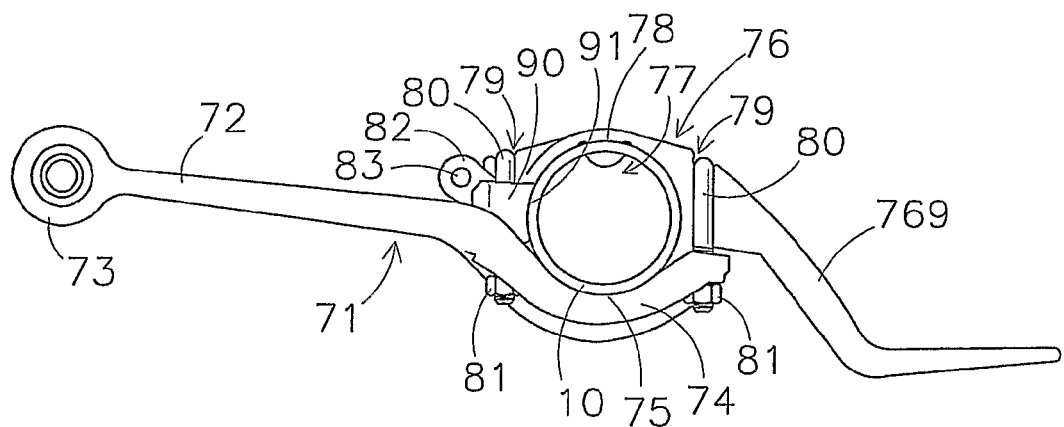
FIG. 7 shows a side view of a trailing arm for an alternative wheel axle suspension according to the invention.

FIG. 7 shows a part of another embodiment of a wheel axle suspension according to the invention. The wheel axle suspension comprises a trailing arm 71 which is similar to the trailing arm 51 which is shown in FIG. 5. At the end which is to be fitted to the front, the trailing arm 71 has a securing eye 73 with which the trailing arm 71 can be attached to a bearing bracket by means of a hinge bolt. The trailing arm 71 has a spring portion 72. Adjacent to the spring portion 72 of the trailing arm 71, a curved portion 74 is formed, which curved portion 74 has an upwardly directed concave contact surface 75. The curved portion 74 here has a greater width than the spring portion 72.

FIG. 7 furthermore shows a support part 76 which is positioned opposite the curved portion and has an axle recess 77 for accommodating a part of the periphery of the axle body 10. In the fitted position, a part of the periphery of the axle body 10 is clamped against the inner wall 78 of the recess 77, which inner wall 78 is complementary to the outer contour of the axle body.

In this example, the support part 76 is clamped against the top side of the axle body 10 by means of U-shaped clamping straps 80. In this example, the top side of the support part 76 is provided with clamp recesses 79 which extend essentially in the transverse direction and at least partially accommodate the bend of the U shape. The downwardly extending legs of the clamping straps 80 are situated along the sides of the support part 76. Using clamping straps 80 instead of bolts (cf. FIGS. 5 and 7) has the advantage that the stretch length increases and the loss of prestress is prevented more effectively.

A separate absorber securing part 90 is clamped at the front of the axle body 10, between the front end of the support part 76, that is to say where the front clamping strap 80 surrounds the support part 76, and the trailing arm 71, at the location of the transition between the spring portion 72 thereof and the curved portion 74 thereof.

In this example, the absorber securing part 90 has a rear concave surface 91 which, in the fitted position, bears against the axle body 10. In this example, the absorber securing part 90 has a few through-holes through which the legs of the front U-shaped clamping strap 79 extend. When the nuts 81 on the legs of the clamping straps 80 are tightened, the absorber securing part 90 is clamped securely.

As can be seen in FIG. 7, approximately 180° of the periphery of the axle body 10 bears against the inner wall 78 of the support part 76. The inner wall 78 of the support part 76, that part of the absorber securing part 90 which is turned towards the axle body 10, and the contact surface 75 of the curved portion 74 of the trailing arm 71 surround virtually the entire periphery of the axle body 10, as FIG. 7 clearly shows. This is advantageous when clamping relatively thin-walled axles, since the load is then omnidirectional, as a result of which the axle body 10 remains round at the location of the clamping arrangement.

In this example, the front of the absorber securing part 90 is provided with two securing lips 82 which extend upwards and to the front at an angle. Each securing lip 82 is provided with a bore hole 83 through which a bolt (not shown) extends in the fitted position. In the fitted position, a securing eye of a shock absorber is situated between the securing lips 82, which securing eye is hingedly connected to the securing lips 82 by means of said bolt.

Similar to the support part 56, the support part 76 is provided with a securing arm 769, which extends from the support part 76 to the rear in the fitted position. The securing arm 769 is designed so that the underside of a pneumatic spring (not shown) can be fitted thereto. The top side of the pneumatic spring is attached to the vehicle chassis. Thus, the pneumatic spring in this case acts on the hingedly connected trailing arm 71 via the support part 76.

The embodiment from FIG. 7 also offers the possibility of using a shell part 60, as has been described above with reference to FIGS. 5 and 6.

Figure 8:
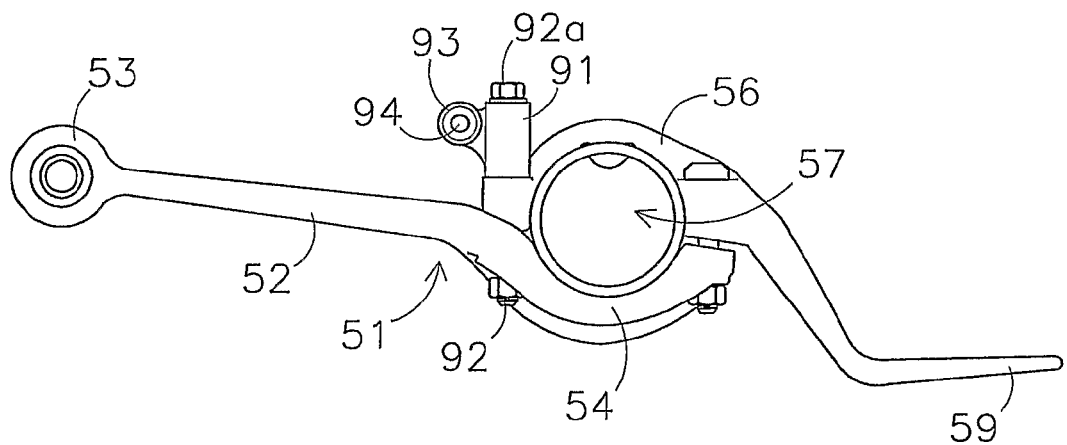
FIG. 8 shows a side view of yet another alternative wheel axle suspension according to the invention.

FIG. 8 shows a variant of the wheel axle suspension from FIG. 5. The wheel axle suspension comprises a trailing arm 51 which substantially corresponds to the trailing arm 51 which is shown in FIG. 5 and has already been described above. The support part 56 is connected to the curved portion 54 by means of bolts. An extension bush 91 is in each case placed on the support part 56, above the front securing holes 561. The front bolts 92 extend through this extension bush 91 and, in the fitted position, the bolt head 92a is on the end side on the top side of the extension bush 91. Preferably, that side of the extension bush 91 which is turned to the front (viewed in the direction of travel of the vehicle) is provided with a securing lip 93 having a bore hole 94. In the fitted position, a hinge bolt is inserted into bore hole 94 in order to hingedly attach an eye of a shock absorber to the lips 93. The use of an extension bush 91 means that bolts 92 having a longer bolt length have to be used, which offers the advantage that the stretch length increases and the loss of prestress is prevented more effectively. An extension bush could also be used with the rear clamping bolts, which would mean that longer bolts would have to be used there as well and the stretch length increases. An extension bush 91 can, if desired, also be designed without an absorber securing lip 93 in order to achieve that advantage, which is regarded as a further aspect of the invention.

Figure 9A:
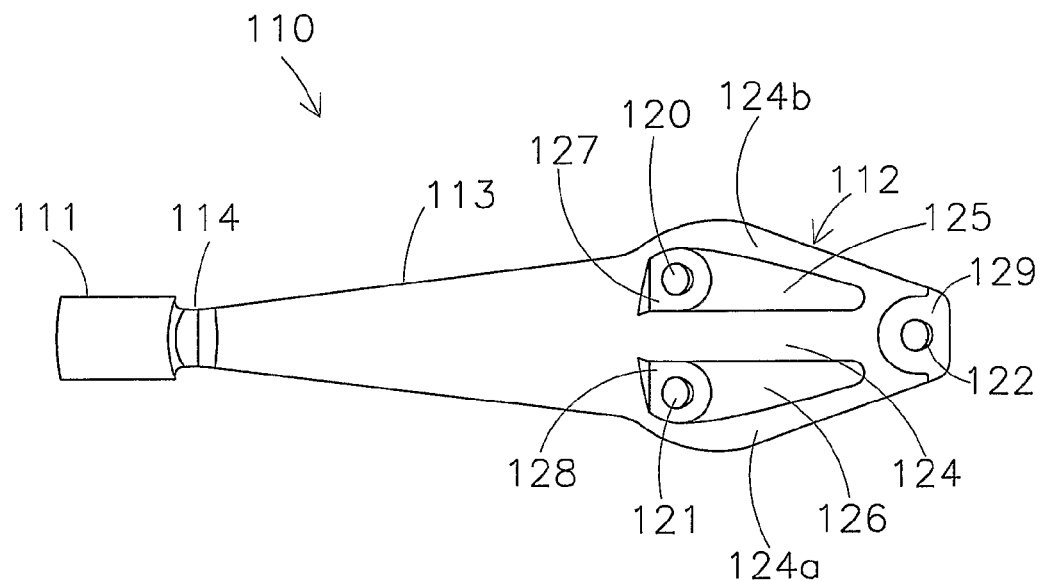
FIG. 9A shows a top view of an alternative exemplary embodiment of a trailing arm for a wheel axle suspension according to the invention.

FIG. 9 shows two views of a trailing arm 110 according to the invention. FIG. 9A shows a top view of a spring trailing arm 110 comprising a securing eye 111, a curved portion which forms the contact region 112 which can accommodate the axle clamp, and a spring portion 113 between these two parts. In the fitted position, the securing eye 111 is attached to a bearing bracket (not shown). The securing eye 111 is at the front of the trailing arm 110 and the portion which forms the contact region 112 is situated, in this example, at the rear of the trailing arm 110.

Holes are provided on both sides of the contact region 112. Two holes 120, 121 at the front of the contact region 112, and one hole 122 at the rear of the contact region 112. Clamping bolts or the shanks of U-shaped clamping straps are inserted through these holes 120-122 in order to clamp the trailing arm 110 to an axle body (not shown). Other clamping means are also possible.

This example clearly shows that the trailing arm 110, at the location of the contact region 112, is wider at the front of the contact region 112 than in the region which is situated in front thereof (in the direction of the securing eye 111) and the rear of the contact region 112 of the trailing arm 110. This measure creates a large contact surface in the area where the load is highest, i.e. at the front of the contact region, using a minimal amount of material, so that the axle body is not undesirably deformed as a result of being clamped.

In this example, depressions 125, 126 have also been provided on the outside of that portion of the trailing arm which forms the contact region 112, with depression 125 extending from hole 120 in the direction of hole 122, and depression 126 extending from hole 121 in the direction of hole 122.

As can be seen, that portion of the trailing arm which forms the axle clamping has, on that side which is turned away from the axle body, a central rib 124 which extends from the front of the contact region, between the two holes 120, 121 on said front, in the direction of the single hole 122 at the rear of the contact region. On either side of this central rib 124, there are depressions 125, 126, wherein in each case one of the holes at the front is provided.

As is preferred, a further rib 124a, 124b is provided along each side edge of the respective portion and delimits the depression on that side.

The embodiment which has been illustrated and described above provides a saving on material while the portion which forms the contact region 112 is sufficiently strong.

In this exemplary embodiment, flat surface portions 127-129 are provided round the holes 120-122. This make it possible for a bolt head or nut to bear against the trailing arm 110 in a neat manner and to transfer the clamping forces onto the trailing arm 110 in an effective manner at relatively low peak stresses. In one variant, it is possible to select the dimensions of the holes and associated clamping means (clamping bolts or straps) in such a manner that clamping of the axle body leads to uniform stresses in the clamping means.

Figure 9B:
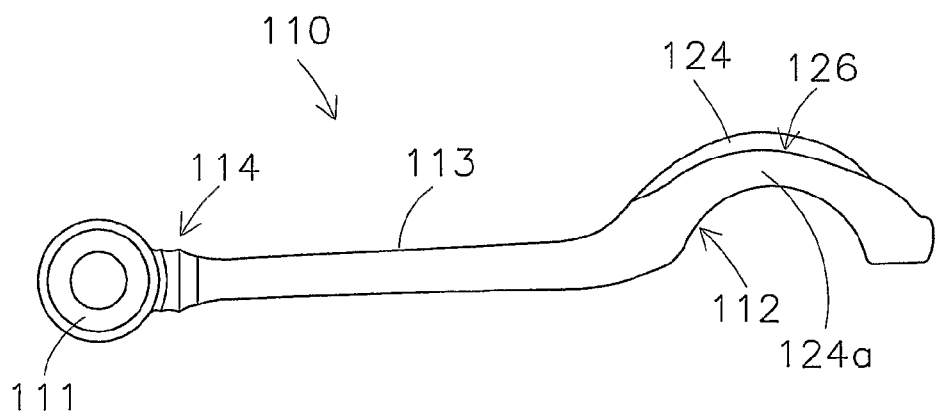
FIG. 9B shows a side view of the alternative exemplary embodiment of FIG. 9A.

FIG. 9B shows the spring trailing arm 110 from FIG. 9A in side view. The two views, FIG. 9A and FIG. 9B together, clearly show that the trailing arm has a portion 114 which is adjacent to the eye 111 and has a substantially round cross section. If the trailing arm 110 is now subjected to a torsional load, this results in virtually uniform deformations and stresses along the periphery of the portion 114.

It is also possible to twist the arm 110 in the region 114 during production of the trailing arm in order to adjust the position of the eye 111 to that required for fitting the trailing arm in the wheel axle suspension. No significant change in shape of the portion 114 can be observed during this twisting operation.

It is possible for the securing eye 111 to be formed in a different position during a manufacturing process, such as forging, after which it is, for example, turned by a quarter turn to a desired position and thus assumes the position illustrated in FIGS. 9A and 9B. In this context, see also FIGS. 11A and 11B. The advantage thereof is that this makes it easier to form the securing eye 111 during the manufacturing process, in other words fewer forming steps or less complicated forming steps are required, following which the arm 110 only has to be twisted locally.

It is possible to produce the trailing arm 110 in a single operation by forging. Preferably, the eye is also forged and this may render finishing of the hole of the eye 111 superfluous.

Preferably, the eye 111 is forged in such a manner that after forging the eye has a closed annular body portion surrounding the hole of the eye, resulting in an eye of great strength.

It should be noted that, for example, a trailing arm 51 which is illustrated in FIG. 5 can also be formed by forging. In this case, only the hole in the eye 53 which is at right angles to the direction of the forging direction (from top to bottom), has to be provided by a finishing operation, for example boring.

Between portion 114 and the portion which forms the contact region 112, the spring portion 113 is present, which in this example has a substantially rectangular cross section. As a result, the trailing arm 110 has different stiffnesses in different directions, which is advantageous, for example, if the trailing arm 110 is also subjected to transverse loads.

In this example, portion 114 merges smoothly with the spring portion having the substantially rectangular cross section. This prevents peak stresses in the material.

The shape of the trailing arm 110 is such that it can be produced in its entirety by forging. Mainly the portion which forms the contact region 112, the front portion 114 and the securing eye 111 are pre-eminently suitable to be formed by forging and are a good example of the additional freedom of design for each portion of the arm compared to the prior-art spring trailing arms which are produced only by means of rolling.

Figure 10:
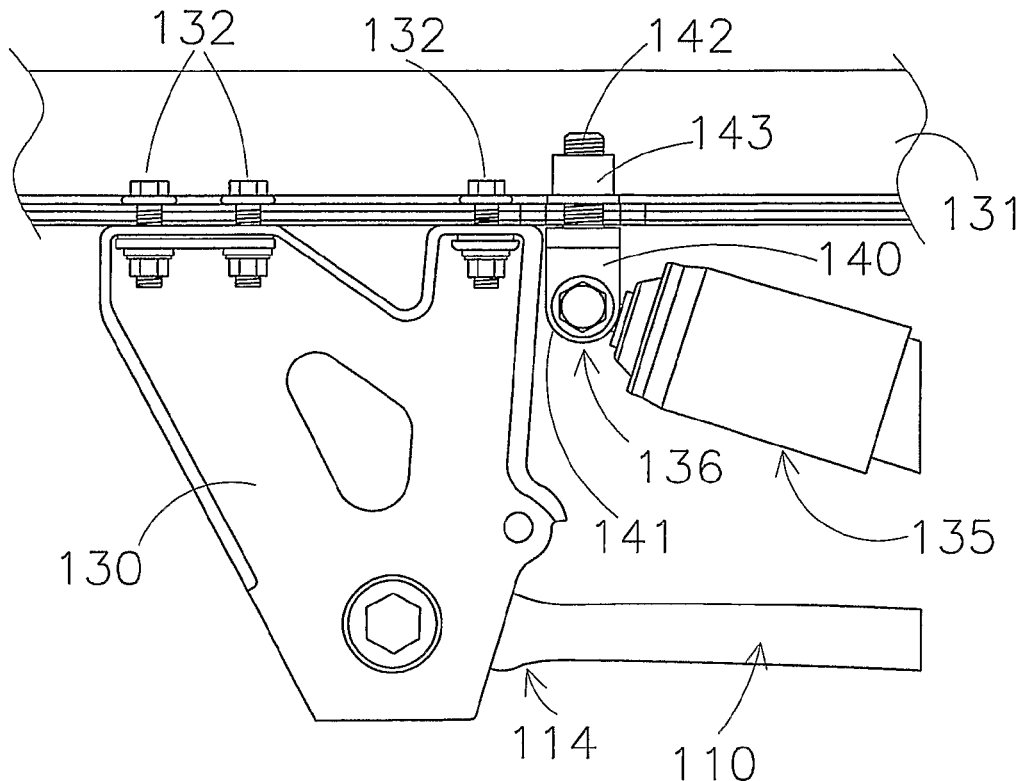
FIG. 10 shows a side view of a bearing bracket and vehicle chassis with an absorber securing part according to the invention fitted thereto.

FIG. 10 shows a bearing bracket 130 which is connected by means of bolt/nut connections to vehicle chassis 131, in this case a longitudinal member of the chassis. In this example, the bearing bracket consists of two plates, each of which is connected to the longitudinal member by means of bolt/nut connections 132. In addition, part of an absorber 135 which is known per se can be seen, which usually has a telescopic body with a securing eye 136 at each end. The absorber securing part 140 is made of metal and has one or more lips or a fork 141 for attaching the eye of the absorber. Said one or more lips may be at an angle, for example approximately in line with the axis of the absorber. The securing part 140 furthermore has an integral bolt shank 142, in this example a single bolt shank, as is preferred. An opening has been drilled in the vehicle chassis, in this case close to the bearing bracket, through which the bolt shank extends. A nut 143 is screwed onto the bolt shank. The advantage is now that the forces are passed directly to the vehicle chassis by the shock absorber, resulting in less stringent requirements being placed on the bearing bracket and thus leading to an improved design.

Figure 11A:
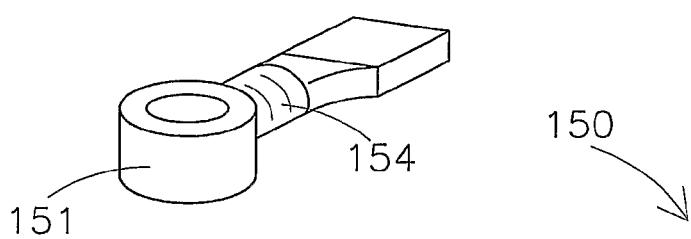
FIG. 11A shows a highly diagrammatic view of a trailing arm with a securing eye according to the invention in a pre-forming position.

FIG. 11A shows a front portion 154 of a trailing arm 150, a securing eye 151 being attached to the front potion 154. The front portion 154 preferably has a substantially round cross section.

Eye 151 is now in the pre-forming position, that is to say the position in which eye 151 is formed. Forming has in this case taken place from the top downwards, preferably by means of a forging device.

Figure 11B:
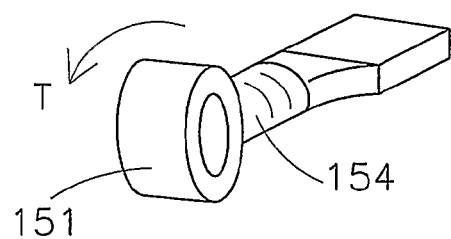
FIG. 11B shows a highly diagrammatic view of the trailing arm of FIG. 11A with the securing eye in a desired position.

After the eye 151 has been formed, eye 151 can still be rotated into a desired position. An example of a desired position is illustrated in FIG. 11B, in which arrow T indicates the rotation of the eye 151. The rotation of the eye 151 has been carried out by twisting the trailing arm in the adjacent front portion 154. In this example, the eye 151 is rotated a quarter turn, but other rotations between 1° and 90°, for example 45°, are also possible. It is also possible to rotate the eye by more than 90°, for example by 120°.

As a result of the round cross section of the front portion 154, no or hardly any change in shape can be seen after twisting. Twisting could also take place in a front portion having a different cross section, for example a rectangular cross section.

It should be noted that the invention is not limited to the specific examples illustrated in the drawing. The person skilled in the art will easily be able to think of variations and combinations of elements from the different exemplary embodiments illustrated and these are deemed to fall within the scope of the invention.

Embodiment 1

Wheel axle suspension for suspending an axle body (10) of a wheel axle from a vehicle, comprising on both sides of the vehicle a trailing arm (1, 41, 51) which extends in the longitudinal direction of the vehicle and to which the axle body (10) is attached, which trailing arm (1, 41, 51) is hingedly connected at the front, viewed in the direction of travel of the vehicle, to a bearing bracket (42) which is arranged on the vehicle chassis (43), as well as a pneumatic spring (44) which is operational between the trailing arm (1, 41, 42) and the chassis (43), wherein the axle body (10), in the fitted position, bears directly against a contact region (5, 45, 55) of the trailing arm (1, 41, 51), which contact region (5, 45, 55) is essentially complementary to the outer contour of the axle body (10), the trailing arm being clamped against the axle body by means of clamping means (23, 24, 47, 48), characterized in that the trailing arm (1, 41, 51) is wider at the location of at least the front of the contact region (5, 45, 55) than in the region (2, 41a, 52) which is situated immediately in front thereof.

Embodiment 2

Wheel axle suspension according to Embodiment 1, wherein a support part (20, 46, 56) is provided on that side of the axle body (10) which is turned away from the contact region (5, 45, 55) of the trailing arm (1, 41, 51), and is provided with a recess (21) for accommodating the axle body, the clamping means (23, 24, 47, 48) clamping the axle body between the support part (20, 46, 56) and the contact region of the trailing arm.

Embodiment 3

Wheel axle suspension according to Embodiment 1 or 2, wherein the axle body is round and hollow in cross section.

Embodiment 4

Wheel axle suspension according to one or more of the Embodiments 1-3, wherein the axle body has a substantially circular cross section at the location of the clamping arrangement.

Embodiment 5

Wheel axle suspension according to one or more of Embodiments 1-4, wherein the trailing arm, at the location of the axle clamping arrangement, is provided with one or more holes on both sides of the axle body for inserting clamping bolts or the shanks of U-shaped clamping straps.

Embodiment 6

Wheel axle suspension according to one or more of Embodiments 1-5, wherein the support part surrounds the axle body over at least 180° of its periphery.

Embodiment 7

Wheel axle suspension according to one or more of the preceding Embodiments, wherein the trailing arm is designed as a spring trailing arm.

Embodiment 8

Wheel axle suspension according to one or more of the preceding Embodiments, preferably according to Embodiment 7, wherein the trailing arm is at least partially produced by forging.

Embodiment 9

Wheel axle suspension according to one or more of the preceding Embodiments, wherein the portion of the trailing arm which forms the contact region tapers towards the rear.

Embodiment 10

Wheel axle suspension according to one or more of the preceding Embodiments, wherein the portion of the trailing arm which forms the contact region, in top view, has an approximately triangular shape, the greatest width of which is situated at the front of said portion and the tip of the triangle being situated at the rear of that portion.

Embodiment 11

Wheel axle suspension according to Embodiment 10, wherein the support part is provided with a securing arm for the pneumatic spring, and wherein the axle body is clamped between the trailing arm and the support part, and wherein the securing arm extends further towards the rear and wherein the clamping means clamp the trailing arm and the support part against the axle body.

Embodiment 12

Wheel axle suspension according to Embodiment 11, wherein two holes are provided near the wide front of that portion of the trailing arm which forms the contact region, and a single hole is provided at the narrower rear of said portion, for example in order to accommodate three clamping bolts (or one U-shaped strap and one bolt).

Embodiment 13

Wheel axle suspension for suspending an axle body of a wheel axle from a vehicle, comprising on both sides of the vehicle a trailing arm (110) which extends in the longitudinal direction of the vehicle and to which the axle body is attached, which trailing arm is hingedly connected at the front, viewed in the direction of travel of the vehicle, to a bearing bracket which is arranged on the vehicle chassis, as well as a pneumatic spring which is operational between the trailing arm and the chassis, wherein the axle body, in the fitted position, bears against a contact region of the trailing arm, which contact region is essentially complementary to the outer contour of the axle body, wherein a support part is provided on that side of the axle body which is turned away from the contact region, which support part is provided with a recess for accommodating the axle body, which support part is clamped against the axle body by means of clamping means, and wherein the trailing arm is provided at the front of the contact region with two holes (120, 121) through which the clamping means extend, characterized in that the trailing arm, at the rear of the contact region, is provided with a single hole (122) through which a clamping means, preferably the shank of a bolt, extends.

Embodiment 14

Wheel axle suspension according to Embodiment 13, wherein the trailing arm (110) is a spring trailing arm.

Embodiment 15

Wheel axle suspension according to Embodiment 13 or 14, wherein the trailing arm (110) is wider at the front of the contact region than at the rear of the contact region.

Embodiment 16

Wheel axle suspension according to Embodiment 14, wherein the spring portion of the spring trailing arm (110) is narrower than at least the front of the contact region.

Embodiment 17

Wheel axle suspension according to one or more of Embodiments 13-16, wherein the portion which forms the contact region (112) has a substantially triangular shape when viewed from the top.

Embodiment 18

Wheel axle suspension according to one or more of Embodiments 13-17, wherein the clamping means are three bolts, the bolt shanks of which extend through the holes, and with the bolt shank at the rear of the contact region having a larger diameter than the bolt shanks at the front of the contact region.

Embodiment 19

Wheel axle suspension according to one or more of Embodiments 13-18, wherein that portion of the trailing arm which constitutes the axle clamping has a central rib (124) on the side which is turned away from the axle body which extends from the front of the contact region, between the two holes at said front, in the direction towards the single hole at the rear of the contact region, a depression (125, 126) being provided on either side of this central rib in which, in each case, one of the holes (121, 122) at the front is situated, with a further rib (124*a*, 124*b*) preferably being present along each side edge of the respective portion which delimits the depression on that side.

Embodiment 20

Wheel axle suspension according to one or more of Embodiments 13-19, wherein the trailing arm (110) is at least partially produced by forging, preferably from spring steel.

Embodiment 21

Wheel axle suspension for suspending an axle body (10) of a wheel axle from a vehicle, comprising a trailing arm (1, 41, 51) which extends in the longitudinal direction of the vehicle and on both sides of the vehicle and to which the axle body (10) is attached, which trailing arm (1, 41, 51) is hingedly connected at the front, viewed in the direction of travel of the vehicle, to a bearing bracket (42) which is arranged on the vehicle chassis (43), as well as a pneumatic spring (44) which is operational between the trailing arm (1, 41, 42) and the chassis (43), wherein a support part (20, 46, 56) is provided on that side of the axle body (10) which is turned away from the trailing arm (1, 41, 51), and is provided with a recess (21) for accommodating the axle body, the clamping means (23, 24, 47, 48) clamping the axle body of the wheel axle between the support part (20, 46, 56) and the contact region of the trailing arm, wherein furthermore an absorber attachment is provided which is provided with one or more lips or a fork for attaching an absorber to the trailing arm, characterized in that a separate absorber securing part (90) is provided which is provided with one or more lips or a fork for hingedly attaching an eye of a shock absorber, which absorber securing part is clamped between the trailing arm and the support part in the fitted position.

Embodiment 22

Wheel axle suspension for suspending an axle body (10) of a wheel axle from a vehicle, comprising a trailing arm (1, 41, 51) which extends in the longitudinal direction of the vehicle and on both sides of the vehicle and to which the axle body (10) is attached, which trailing arm (1, 41, 51) is hingedly connected at the front, viewed in the direction of travel of the vehicle, to a bearing bracket (42) which is arranged on the vehicle chassis (43), as well as a pneumatic spring (44) which is operational between the trailing arm (1, 41, 42) and the chassis (43), wherein a support part (20, 46, 56) is provided on that side of the axle body (10) which is turned away from the trailing arm (1, 41, 51), and is provided with a recess (21) for accommodating the axle body, the clamping means (23, 24, 47, 48) clamping the axle body of the wheel axle between the support part (20, 46, 56) and the contact region of the trailing arm, wherein furthermore an absorber attachment is provided which is provided with one or more lips or a fork for attaching an absorber to the trailing arm, characterized in that a separate absorber securing part with a bush (91) is provided through which, in the fitted position, a shank of one of the clamping means, for example a clamping bolt or clamping strap, extends, by means of which clamping means the bush is clamped against the trailing arm or support part, the bush being provided with one or more lips or a fork (93) for hingedly attaching an eye of a shock absorber.

Embodiment 23

Wheel axle suspension for suspending an axle body (10) of a wheel axle from a vehicle, comprising a trailing arm (1, 41, 51) which extends in the longitudinal direction of the vehicle and on both sides of the vehicle and to which the axle body (10) is attached, which trailing arm (1, 41, 51) is hingedly connected at the front, viewed in the direction of travel of the vehicle, to a bearing bracket (42) which is arranged on the vehicle chassis (43), as well as a pneumatic spring (44) which is operational between the trailing arm (1, 41, 42) and the chassis (43), wherein a support part (20, 46, 56) is provided on that side of the axle body (10) which is turned away from the trailing arm (1, 41, 51), and is provided with a recess (21) for accommodating the axle body, the clamping means (23, 24, 47, 48) clamping the axle body of the wheel axle between the support part (20, 46, 56) and the contact region of the trailing arm, wherein furthermore an absorber attachment is provided which is provided with one or more lips or a fork for attaching an absorber to the trailing arm, characterized in that the absorber attachment (25; 49) is integrally formed with one of the clamping means, for example one clamping means is designed as a bolt with a bolt shank and a bolt head, the bolt head being provided with one or more lips or a fork for hingedly attaching an eye of a shock absorber.

Embodiment 24

Wheel axle suspension for suspending an axle body of a wheel axle from a vehicle, comprising a trailing arm which extends in the longitudinal direction of the vehicle and to which the axle body is attached, which trailing arm, in the direction of travel of the vehicle, is hingedly connected at the front to a bearing bracket which is arranged on the vehicle chassis, wherein furthermore an absorber attachment is provided for attaching an absorber which absorbs the movement of the trailing arm, which absorber has a telescopic body having an eye at each end of the body, characterized in that the wheel axle suspension comprises a separate absorber securing part (140) which is provided with one or more lips or a fork for hingedly attaching an eye of a shock absorber, which absorber securing part (140), in the fitted position, is directly connected to the vehicle chassis.

Embodiment 25

Wheel axle suspension according to Embodiment 24, wherein the absorber securing part is provided with an integral bolt shank (142), preferably a single integral bolt shank, which is inserted through an opening in the chassis of the vehicle and secured by means of a nut (143).

Embodiment 26

Assembly for a wheel axle suspension for suspending an axle from a vehicle, comprising:

a trailing arm (51, 71) which, in use, extends in the longitudinal direction of the vehicle and to which the axle can be attached, wherein the trailing arm (51, 71) can be hingedly connected to a bearing bracket which is attached to the vehicle chassis, which trailing arm (51, 71) has a contact region (55, 75) against which an axle body having a first outer diameter can bear directly, wherein the contact region (55, 75) is substantially complementary to the outer contour of the axle body having the respective outer diameter, a support part (56, 76) which, in use, can be attached on that side of the axle body which is turned away from the contact region (55, 75) of the trailing arm, which support part (56, 76) is provided with a recess (57, 77) for accommodating the axle, and which support part (56, 76) is furthermore provided with a securing arm (59, 769) which, in the fitted position, extends to the rear from the support part (59, 769), which securing arm (59, 769) is designed so that the underside of a pneumatic spring can be fitted thereto, the top side of the pneumatic spring being attached to the vehicle chassis, clamping means for clamping the contact region (55, 75) of the trailing arm (51, 71) and the support part (56, 76) against the axle body, and a shell part (60) which can be fitted between the contact region (55, 75) of the trailing arm (51, 71) and an axle body, which shell part (60) has an outer contact surface (62) which is designed to bear in a fitting manner against the contact region which has a diameter which is adapted to the first diameter and has an inner contact surface (61) which is designed to bear against an axle body having a second diameter, the second diameter being smaller than the first diameter.

Embodiment 27

Method for producing wheel axle suspensions for wheel axles having axle bodies of different diameters, wherein use is made of the assembly according to Embodiment 26, wherein, based on the diameter of the axle body, no shell part or a shell part (60) adapted to the diameter is fitted between the axle body and the trailing arm.

Embodiment 28

Method according to Embodiment 27, wherein different support parts (56; 76) having a recess adapted to the different diameters of the axle bodies are provided, with a support part being selected and fitted in the wheel axle suspension based on the diameter of the respective axle body.

Embodiment 29

Method according to Embodiment 27 or 28, wherein the trailing arm (51) is produced by rolling and/or forging, and wherein the support part (56; 76) is produced by casting or forging.

Embodiment 30

Method for producing a spring trailing arm designed for a pneumatically sprung wheel axle suspension, preferably a wheel axle suspension for suspending an axle body of a wheel axle from a vehicle, comprising a trailing arm which extends in the longitudinal direction of the vehicle and on both sides of the vehicle and to which the axle body is attached, which trailing arm is hingedly connected at the front, viewed in the direction of travel of the vehicle, to a bearing bracket which is arranged on the vehicle chassis, as well as a pneumatic spring which is operational between the trailing arm and the chassis, characterized in that the trailing arm (41; 51; 71; 110; 150) is at least partially produced by forging.

Embodiment 31

Method according to Embodiment 30, wherein the trailing arm (41; 51; 71; 110; 150) is made of spring steel.

Embodiment 32

Method according to Embodiment 30 or 31, wherein forging is carried out on a rolled and/or cast semi-finished product.

Embodiment 33

Method according to one or more of Embodiments 30-32, wherein the trailing arm, during forging, comprises a projecting part which is suitable for holding the semi-finished product during forging and which is removed after the forging process.

Embodiment 34

Method according to one or more of Embodiments 30-33, wherein the trailing arm on the front end thereof is provided with a securing eye (111) which is formed by forging, preferably in such a manner that the eye has a closed annular body portion around the hole of the eye.

Embodiment 35

Method for producing a trailing arm for a wheel axle suspension for suspending an axle body for a vehicle, wherein a securing eye is formed on the trailing arm by means of which the trailing arm can be hingedly connected on a bearing bracket on a vehicle chassis, characterized in that, following the formation of the securing eye (111), the trailing arm (110) is twisted about the longitudinal axis of the trailing arm, so that the securing eye (111) is rotated through an angle, said twisting preferably taking place in a portion (114) of the trailing arm which adjoins the securing eye.

Embodiment 36

Method according to Embodiment 35, wherein the trailing arm is formed from a semi-finished product having a width which is greater than the thickness, wherein the securing eye (111) is then formed in a pre-forming position, wherein the axis of the securing eye extends substantially parallel to the thickness direction, following which the eye (111) is moved to a desired position by twisting the trailing arm, preferably in a portion (114) of the trailing arm which adjoins the securing eye.

Embodiment 37

Method according to Embodiment 36, wherein the securing eye (111) is rotated substantially through 90° with respect to the pre-forming position after the trailing arm has been twisted.

Embodiment 38

Method according to one or more of Embodiments 35-37, wherein the trailing arm (110) is at least partially produced by forging.

Embodiment 39

Method according to one or more of Embodiments 35-38, wherein the securing eye (111) is produced by forging, preferably in such a manner that the eye has a closed annular body portion surrounding the hole of the eye.

Embodiment 40

Method according to one or more of Embodiments 35-39, wherein the trailing arm, adjacent to the securing eye, has a portion (114) which is to be twisted and has a substantially round cross section, which region is twisted in order to move the eye into the desired position.

Embodiment 41

Method according to Embodiment 40, wherein the portion (114) to be twisted and having a round cross section is produced by forging, preferably at the same time as the forging of the securing eye.

Embodiment 42

Method according to one of more or Embodiments 35-41, wherein the trailing arm, at least the securing eye thereof and any portion adjacent thereto which is to be twisted and has a round cross section, is formed by forging in a forging device, wherein twisting takes place after forging using a twisting device, when at least the portion of the trailing arm which is to be twisted is hot, preferably still hot from forging, and wherein twisting preferably takes place in a single uninterrupted twisting movement.

Embodiment 43

Trailing arm for a wheel axle suspension for suspending an axle body of a wheel axle from a vehicle, which trailing arm has a securing eye at the front end for attaching the trailing arm to the vehicle, for example to a bearing bracket which is provided on the vehicle chassis, for example using a hinge bolt, characterized in that the trailing arm (110), adjacent to the securing eye (111), has a portion which has a substantially round cross section (114), in particular a circular cross section.

Embodiment 44

Trailing arm according to Embodiment 43, wherein the trailing arm comprises a portion (113) having a substantially rectangular cross section between the portion having a substantially round cross section (114) and a portion which is designed for attaching the axle body.

Embodiment 45

Trailing arm according to Embodiment 44, wherein the portion having the substantially round cross section (114) merges smoothly with the portion having the substantially rectangular cross section (113).

Embodiment 46

Trailing arm according to one or more of Embodiments 43-45, wherein the trailing arm is a spring trailing arm (110).

Embodiment 47

Trailing arm according to Embodiment 45 and Embodiment 46, wherein the portion having the substantially rectangular cross section is the spring portion (113) of the spring trailing arm.

Embodiment 48

Trailing arm according to one or more of Embodiments 43-47, wherein the portion having a substantially round cross section (114), and preferably also the securing eye (111), is formed by means of forging, wherein, in the case of a spring trailing arm, the spring portion (113) is preferably also formed by forging.

Embodiment 49

Trailing arm according to one or more of Embodiments 43-48, wherein the portion having the substantially round cross section (114) is twisted in order to move the eye into a desired position.

Embodiment 50

Method for producing a trailing arm according to Embodiment 48, wherein the portion (114) having a substantially round cross section, and preferably also the securing eye, is formed by means of forging, wherein, in the case of a spring trailing arm, the spring portion is preferably also formed by forging.

Embodiment 51

Wheel axle suspension, preferably a pneumatically sprung wheel axle suspension, provided with a trailing arm according to one or more of Embodiments 43-49.

The invention claimed is:

1. A wheel axle suspension adapted to suspend an axle body of a wheel axle from a vehicle chassis of a vehicle, said suspension comprising on both sides of the vehicle:
    a bearing bracket arranged on the vehicle chassis;
    a rigid trailing arm extending in a longitudinal direction of the vehicle, said trailing arm having a resilient bush at a front end by means of which the trailing arm is hingedly connected to said bearing bracket, the trailing arm furthermore having a contact region essentially complementary to a portion of an outer contour of the axle body, where the axle body, in a fitted position, bears directly against the contact region;
    a support part opposing said contact region of the trailing arm, said support part being provided with an axle recess for accommodating the axle body, and being provided with a securing arm extending further towards the rear;
    a pneumatic spring which is operational between said securing arm and the vehicle chassis, the securing arm being adapted to be secured to the pneumatic spring; and
    two equally sized and shaped U-shaped clamping straps, each having a bend portion and two shanks having a male thread and each arranged on an opposite side of the axle body tensioning the support part and the contact region of the trailing arm towards each other against the axle body;
    wherein the support part is provided with holes for inserting each of the shanks of said U-shaped clamping straps, and
    wherein the trailing arm, at the location of the contact region, is provided with recesses for accommodating said bend portions of said U-shaped clamping straps.

2. A wheel axle suspension adapted to suspend an axle body of a wheel axle from a vehicle chassis of a vehicle, said suspension comprising on both sides of the vehicle:
    a bearing bracket arranged on the vehicle chassis;
    a rigid trailing arm extending in a longitudinal direction of the vehicle, said trailing arm having a resilient bush at a front end by means of which the trailing arm is hingedly connected to said bearing bracket, the trailing arm furthermore having a contact region essentially complementary to a portion of an outer contour of the axle body, where the axle body, in a fitted position, bears directly against the contact region;
    a support part opposing said contact region of the trailing arm, said support part being provided with an axle recess for accommodating the axle body, and being provided with a securing arm extending further towards the rear;
    a pneumatic spring which is operational between said securing arm and the vehicle chassis, the securing arm being adapted to be secured to the pneumatic spring; and
    two equally sized and shaped U-shaped clamping straps, each having a bend portion and two shanks having a male thread and each arranged on an opposite side of the axle body tensioning the support part and the contact region of the trailing arm towards each other against the axle body;
    wherein one of the trailing arm, at the location of the contact region, or the support part is provided with holes for inserting each of the shanks of said U-shaped clamping straps, and wherein the other of the support part or the trailing arm, at the location of the contact region, is provided with recesses for accommodating said bend portions of said U-shaped clamping straps.

3. A wheel axle suspension adapted to suspend an axle body of a wheel axle from a vehicle chassis of a vehicle, said suspension comprising on both sides of the vehicle:
    a bearing bracket arranged on the vehicle chassis;
    a rigid trailing arm extending in a longitudinal direction of the vehicle, said trailing arm having a resilient bush at a front end by means of which the trailing arm is hingedly connected to said bearing bracket, the trailing arm furthermore having a contact region essentially complementary to a portion of an outer contour of the axle body, where the axle body, in a fitted position, bears directly against the contact region, the trailing arm at the location of the contact region having one or more holes on both sides of the axle body;
    a support part opposing said contact region of the trailing arm, said support part being provided with an axle recess for accommodating the axle body, and being provided with a securing arm extending further towards the rear;
    tensioning elements tensioning the support part and the contact region of the trailing arm towards each other against the axle body, the tensioning elements having shanks, the holes in the trailing arm being adapted to receive the shanks of the tensioning elements; and
    a pneumatic spring which is operational between said securing arm and the vehicle chassis, the securing arm being adapted to be secured to the pneumatic spring.

4. A wheel axle suspension adapted to suspend an axle body of a wheel axle from a vehicle chassis of a vehicle, said suspension comprising on both sides of the vehicle:
    a bearing bracket arranged on the vehicle chassis;
    a rigid trailing arm extending in a longitudinal direction of the vehicle, said trailing arm having a resilient bush at a front end by means of which the trailing arm is hingedly connected to said bearing bracket, the trailing arm furthermore having a contact region essentially complementary to a portion of an outer contour of the axle body, where the axle body, in a fitted position, bears directly against the contact region;

a support part opposing said contact region of the trailing arm, said support part being provided with an axle recess for accommodating the axle body, said support part being provided with a clamp recess, and being provided with a securing arm extending further towards the rear;

tensioning elements tensioning the support part and the contact region of the trailing arm towards each other against the axle body, at least one of the tensioning elements being a U-shaped clamping strap having a bend portion and two shanks having a male thread, the bend portion being received in the clamp recess; and a pneumatic spring which is operational between said securing arm and the vehicle chassis, the securing arm being adapted to be secured to the pneumatic spring.

5. A wheel axle suspension adapted to suspend an axle body of a wheel axle from a vehicle chassis of a vehicle, said suspension comprising on both sides of the vehicle:

a bearing bracket which is arranged on the vehicle chassis;

a flexible trailing arm extending in a longitudinal direction of the vehicle, said trailing arm being hingedly connected at a front end to the bearing bracket, the trailing arm having a contact region essentially complementary to a portion of an outer contour of the axle body, where the axle body, in a fitted position, bears directly against the contact region, the trailing arm, at the location of the contact region, being provided with one or more holes on both sides of the axle body;

a support part opposing said contact region of the trailing arm, said support part being provided with an axle recess for accommodating the axle body, and being provided with a securing arm extending further towards the rear;

tensioning elements tensioning the support part and the contact region of the trailing arm towards each other against the axle body, the tensioning elements having shanks adapted for insertion into the trailing arm holes; and a pneumatic spring which is operational between said securing arm and the vehicle chassis, the securing arm being adapted to be secured to the pneumatic spring.

6. A wheel axle suspension adapted to suspend an axle body of a wheel axle from a vehicle chassis of a vehicle, said suspension comprising on both sides of the vehicle:

a bearing bracket which is arranged on the vehicle chassis;

a flexible trailing arm extending in a longitudinal direction of the vehicle, said trailing arm being hingedly connected at a front end to the bearing bracket, the trailing arm having a contact region essentially complementary to a portion of an outer contour of the axle body, where the axle body, in a fitted position, bears directly against the contact region;

a support part opposing said contact region of the trailing arm, said support part being provided with an axle recess for accommodating the axle body, and being provided with a securing arm extending further towards the rear;

tensioning elements tensioning the support part and the contact region of the trailing arm towards each other against the axle body, the tensioning elements including bolts having a head and a shank; and a pneumatic spring which is operational between said securing arm and the vehicle chassis, the securing arm being adapted to be secured to the pneumatic spring.

7. A wheel axle suspension adapted to suspend an axle body of a wheel axle from a vehicle chassis of a vehicle, said suspension comprising on both sides of the vehicle:

a bearing bracket which is arranged on the vehicle chassis;

a flexible trailing arm extending in a longitudinal direction of the vehicle, said trailing arm being hingedly connected at a front end to the bearing bracket, the trailing arm having a contact region essentially complementary to a portion of an outer contour of the axle body, where the axle body, in a fitted position, bears directly against the contact region;

a support part opposing said contact region of the trailing arm, said support part being provided with an axle recess for accommodating the axle body, said support part being provided with a clamp recess, and being provided with a securing arm extending further towards the rear;

tensioning elements tensioning the support part and the contact region of the trailing arm towards each other against the axle body, at least one of the tensioning elements being a U-shaped clamping strap having a bend portion and two threaded shanks, the bend portion being received in the clamp recess; and a pneumatic spring which is operational between said securing arm and the vehicle chassis, the securing arm being adapted to be secured to the pneumatic spring.

8. An assembly for a wheel axle suspension for suspending an axle from a vehicle chassis of a vehicle, comprising:

a trailing arm which, in use, extends in the longitudinal direction of the vehicle and to which the axle can be attached, wherein the trailing arm is adapted to be hingedly connected to a bearing bracket which is attached to the vehicle chassis, which trailing arm has a contact region against which a first axle body having a first outer diameter can bear directly, wherein the contact region is substantially complementary to an outer contour of the first axle body having said first outer diameter;

a support part adapted to oppose the contact region of the trailing arm, which support part is provided with an axle recess for accommodating the axle, and which support part is furthermore provided with a securing arm which, in the fitted position, extends to the rear from the support part, which securing arm is designed so that the underside of a pneumatic spring can be fitted thereto, the top side of the pneumatic spring being attached to the vehicle chassis;

clamping elements for clamping the contact region of the trailing arm and the support part against the first axle body; and a shell part which can be fitted between the contact region of the trailing arm and a second axle body, which shell part has an outer contact surface which is designed to bear in a fitting manner against the contact region which has a diameter which is adapted to the first diameter and has an inner contact surface which is designed to bear against the second axle body having a second diameter, the second diameter being smaller than the first diameter.

* * * * *